Sept. 26, 1961 R. D. RUMSEY 3,001,741
AIRCRAFT LINEAR STEER DAMPER
Filed Jan. 20, 1958 3 Sheets-Sheet 1

Inventor
Rollin D. Rumsey

By Hill, Sherman, Meroni, Gross & Simpson Attys

Sept. 26, 1961 R. D. RUMSEY 3,001,741
AIRCRAFT LINEAR STEER DAMPER
Filed Jan. 20, 1958 3 Sheets-Sheet 2
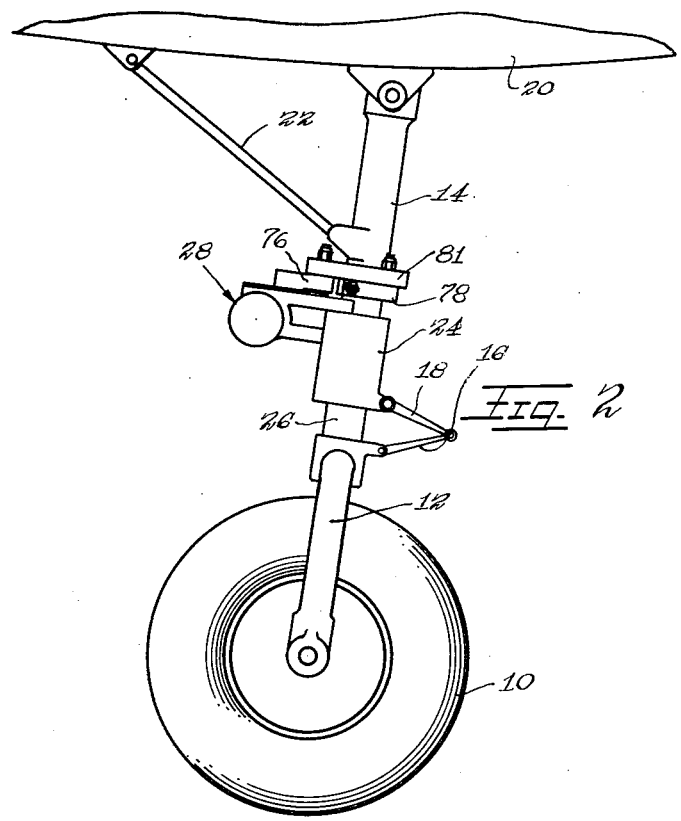
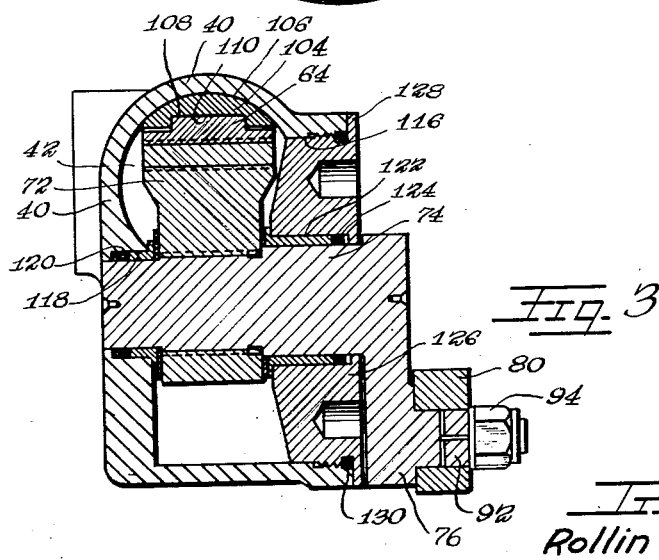
Inventor
Rollin D. Rumsey

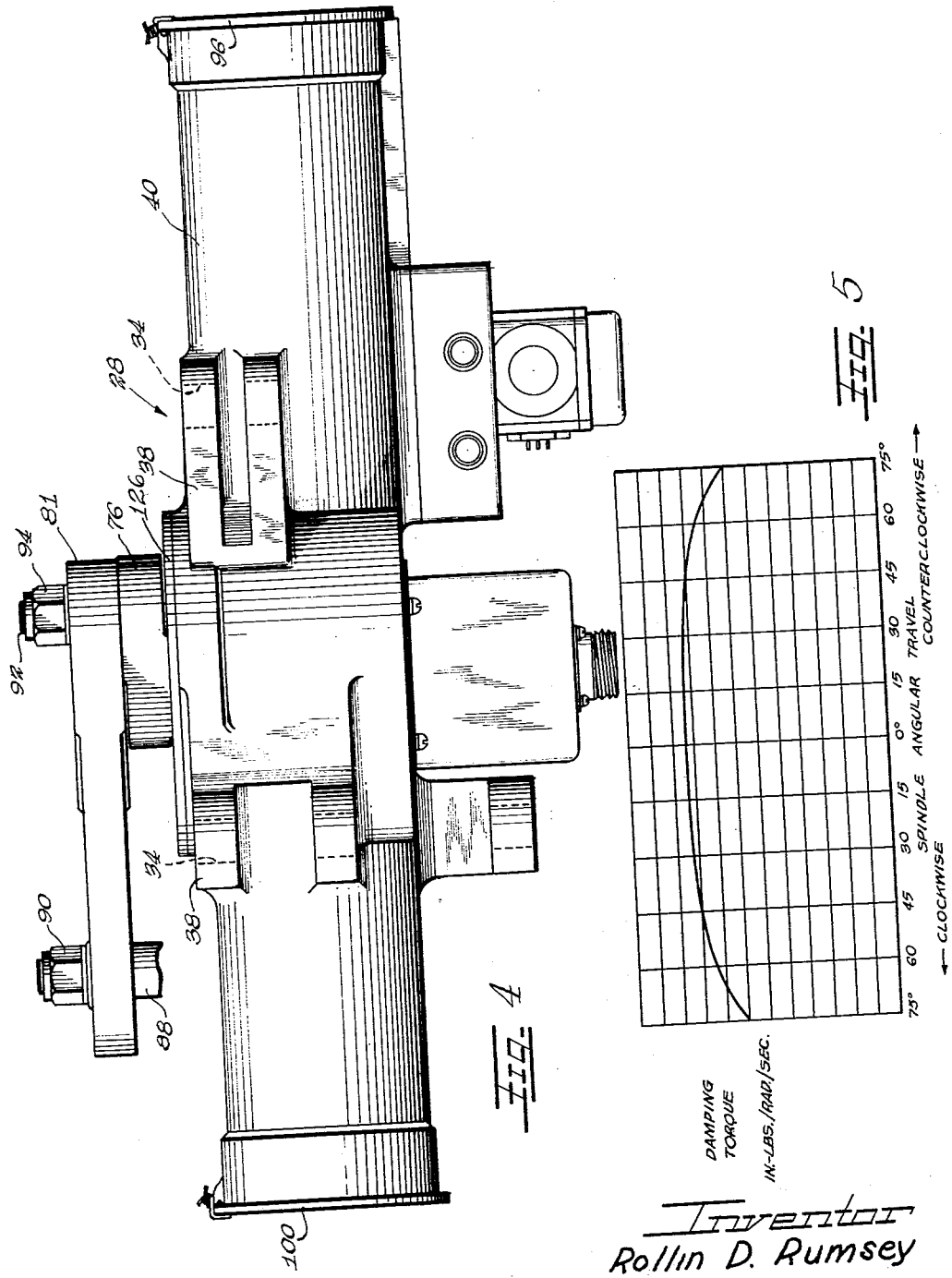

United States Patent Office 3,001,741
Patented Sept. 26, 1961

3,001,741
AIRCRAFT LINEAR STEER DAMPER
Rollin Douglas Rumsey, Buffalo, N.Y., assignor to Houdaille Industries, Inc., Buffalo, N.Y., a corporation of Michigan
Filed Jan. 20, 1958, Ser. No. 710,022
4 Claims. (Cl. 244—50)

The present invention relates to improvements in a linear type steer damper, in which a linear damping mechanism applies a damping force to a rotary member, such as a wheel for aircraft or the like. More particularly, the invention relates to an improved damping mechanism wherein shocks and vibrations of a vertical member, such as is used to support a tail wheel for an airplane, are damped in a rotational direction by damping force transmitted from a linear damping mechanism, such as a piston within a chamber. The damping force applied in a rotary direction is substantially uniform and equal for various steering positions through a predetermined steering arc with the damping force applied by a linear damper.

It is accordingly an object of the invention to provide improved rotary shaft control means operating in combined relationship with an improved damping means particularly adapted to use on a steering and shimmy damping mechanism for steering wheels of aircraft and the like.

Another object of the invention is to provide a rotary shaft control wherein the shaft may be positioned in a plurality of fixed positions with a uniform damping force applied to the shaft to prevent rotary motion due to shock and shimmy in any predetermined position of the shaft.

A further object of the invention is to provide an improved linear damper mechanism for damping rotational members in their movement, and which is of improved construction and manufacture, and simplified in construction in order that it may be economically manufactured, and easily attached and serviced for use on aircraft.

Another object of the invention is to provide an improved steering and damping mechanism which utilizes linear damping, and applies a damping force to a rotary member which is substantially uniform for various positions of the rotary member, and various positions of the linear damper.

An object of the invention is to provide a linear steer damper employing a piston within a cylinder transmitting a damping and steering force through a rack and gear arrangement and possessing an improved construction for removing back lash between the rack and gear.

A feature of the invention is to provide a linear type steer damper for aircraft or the like having a wheel mounted for rotation about a horizontal axis, a vertical member attached to the wheel and pivotal about a vertical axis with steering movement of the wheel, steering means connected to the vertical member for turning the wheel to various steering positions through a predetermined steering arc, and a means connected to the vertical member and applying a damping force independent of the steering positions and resisting pivotal movement, the damping force remaining substantially constant for positions of the wheel within the arc.

Other objects, features and advantages of the invention will become apparent with the teaching of the principles of the invention in connection with the disclosure of the preferred embodiments in the specification, claims and drawings, in which:

FIGURE 2 is a side elevational view of a tail or nose wheel for an airplane in combination with a linear type steer damper of the present invention;

FIGURE 3 is a sectional view taken along line III—III of FIGURE 1;

FIGURE 4 is an elevational view of the linear type steer damper; and,

FIGURE 5 is an illustration in graph form showing the uniformity of the damping torque for various positions of the steering wheel.

Figure 1:
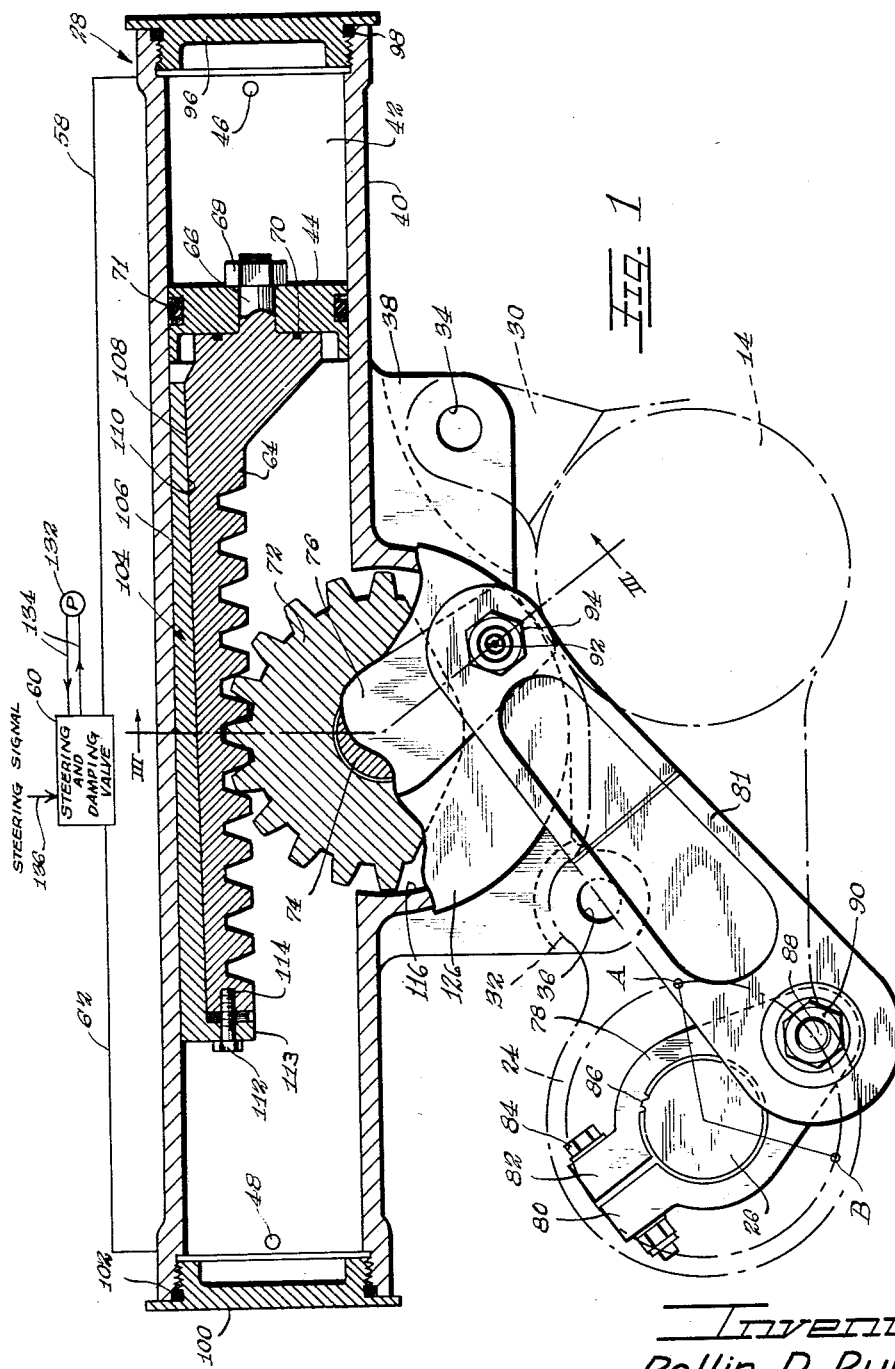
FIGURE 1 is a plan view of a linear type steer damper embodying the principles of the invention and showing the steering and damping piston and cylinder in section.

Referring to FIGURE 2, an illustration of a combination embodying the invention in an airplane tail wheel is shown. A tail wheel 10 is mounted for rotation on a fork 12 carried at the lower end of an oleo strut 14. The oleo strut is of a type known to the art, and contains spring means or hydraulic fluid for resistance means for damping movement of the fork and wheel to absorb the shock of vertical movement of the wheel. The fork 12 is hinged at the lower end of the oleo strut 14, and the hinged portion is additionally joined by hinged struts 16 and 18, connected at their ends respectively to the fork portion and the oleo strut portion.

The upper end of the oleo strut is secured to a fuselage 20 of the airplane, and is supported by an angular strut 22, also extending between the oleo strut and the fuselage 20.

The oleo strut assembly 14 carries at its lower end a rotatable vertical bearing member 24, to which is connected the vertical shaft 26. The vertical shaft projects upwardly from the fork 12, and permits turning of the wheel about a vertical axis for steering the tail wheel.

The tail wheel is steered and is damped against shock and shimmy, such as occurs to the wheel during landing and when rolling on the ground, by a steer damper assembly 28. The steer damper assembly is shown in its operative position with respect to the wheel assembly in FIGURE 2, and is shown in detail in FIGURES 1, 3 and 4.

As illustrated in FIGURE 1, the oleo strut assembly 14 is provided with brackets 30 and 32, for purposes of mounting the steer damper 28. Holes are provided through the brackets as illustrated at 34 and 36, to receive bolts, not shown, and secure mounting brackets 38 of the steer damper assembly to the brackets 30 and 32. The mounting brackets 38 are formed integral as part of the casting of a fluid cylinder 40, FIGURE 4.

The fluid cylinder provides a cylindrical chamber 42 within which is located a horizontally reciprocating piston 44. The chamber 42 contains fluid which is under pressure and controllably flows into either end of the chamber 42 to control the position of the piston 44.

The flow of steering and damping fluid into one end of the chamber 42 is through port 46. The steering and damping fluid enters and leaves the other end of the chamber 42 through a port 48. While port 48 is shown at the end of the chamber, it may be located more near the piston such as the same distance to the left of the piston 44 as the part 46 is to the right of the piston. This will simplify and shorten mechanical porting and connecting lines.

The port 46 connects to a fluid line 58 through which the flow of fluid is controlled by a steering and damping valve 60. The flow of fluid through port 48 is controlled by a connected fluid line 62, which also connects to the steering and damping valve 60, FIGURE 1. The steering and damping valve 60 may take various forms, as will be appreciated by those skilled in the art, and a valve is used of the type shown in the copending application U.S. Serial No. 613,669, O'Connor and Whelphy, "Hydraulic Bridge Control System," filed October 3, 1956.

The motion of the piston 44 within the steering and damping chamber 42 is transmitted to the vertical shaft 26 on which the wheel is supported. For this purpose, the piston 44 is connected to a rack 64. Connection is obtained by a threaded stud 66 at the end of the rack passing through an opening in the piston and receiving a nut 68 to secure it to the piston. A seal 70 is provided to prevent leakage through the opening receiving the stud 66. The piston carries a seal 71 which prevents leakage past the piston along the wall of the chamber 42.

The rack 64 is in meshing engagement with the segment gear 72. The segment gear is secured to a vertical shaft 74, which carries at its upper end an integral crank 76. The vertical shaft 74 is substantially parallel to the shaft or spindle 26 carrying the wheel.

Pivotal movements of the segment gear 72 which are transmitted to the crank 76, are transmitted to another crank 78 through a connecting link 81. The cranks 76 and 78 are parallel when in centered operating position as illustrated in FIGURE 1, and crank 76 is at least as long as crank 78 or slightly longer.

The crank 78 has a clevis-shaped end which is slid over the top of the vertical shaft and the ends 80, 82 of the crank are drawn together by a bolt 84. The upper end of the shaft is provided with a spline 86, which projects into a groove in the crank 78 to positively lock the rotational position of the shaft 26 with respect to the crank 78. A spline 86 arranged completely around the shaft 26 may be employed.

The end of the crank 78 is connected to the link 81 by a vertical pin 88, and the link is held to the pin by a nut 90 threaded on the pin.

The other end of the link 81 is pivotally connected to the crank 76 by a vertical pin 92 which receives a nut 94 to hold the link on the pin. The link 81 is of a length to permit cranks 76 and 78 to be of the same length although other arrangements may be used. For example, crank 76 may be slightly longer than crank 78 in order for crank 78 to rotate a full 360° while crank 76 will oscillate for an arc of approximately 85°. For the transfer of motion from the crank 76 to the crank 78, the shaft 74, carrying a pinion 72, is parallel to the vertical shaft 26.

The cylinder 40 and the integral assembled parts are easily manufactured. The cylinder may be made by being cast and bored or reamed, completely from one end to the other. The ends may then be threaded for receiving caps to close the ends of the chamber 42. At one end, a cap 96 is screwed into the end of the cylinder to close the chamber. A seal 98 is provided to prevent leakage past the cap. At the other end a cap 100 is screwed into the end of the cylinder, and a seal 102 prevents the leakage of liquid.

To prevent lash between the rack 64 and the segment gear 72, means are provided for lateral adjustment of the rack in a direction radial of the gear 72. The rack rests against a tapered adjusting member 104 which has a curved back surface 106 to slide against the inner wall of the chamber 42. The rear surface 108 of the rack is tapered and the upper surface 110 of the adjustment member 104 is also tapered. Thus, as the rack and adjustment member 104 are slid axially with respect to each other, the lateral position of the rack is adjusted, FIGURES 1 and 3.

For purposes of such adjustment, the adjustment member 104 has a lateral integral flange 113 at one end with a hole therethrough to receive an adjustment bolt 112. The adjustment bolt threads into a threaded hole 114 in the end of the rack, and rotation of the bolt 112 will adjust the relative axial position of the rack and adjustment member 104. It will be seen that as the bolt 112 is tightened to pull the adjustment member 104 toward the rack, the rack will be wedged toward the segment gear 72 to remove what lash may be present between the gear teeth and rack teeth. The adjustment member and rack are thus wedged between the curved inner wall of the chamber 42 and the teeth of the segment gear 72. As illustrated in FIGURE 3, the curved back 106 of the adjusting member 104 slides against the inner wall of the chamber 42. To maintain the adjustment member 104 in axial alignment with the rack 64, and prevent the adjustment member from working its way out from beneath the rack, the inclined surface 110 of the adjustment member is recessed and the inclined surface 108 of the rack projects upwardly to slide into the recess, thus holding the two in axial alignment, by sliding tongue and groove relationship.

As illustrated in FIGURE 3, the segment gear 72 may be assembled in the housing 40 for the steer damper by dropping it downwardly into the circular opening 116 at the top of the housing. The shaft 74 carrying the segment gear rotates in a bearing 118 at the base of the housing 40, and is sealed by an annular sealing ring 120 to prevent the escape of pressurized liquid. The upper end of the shaft is supported in a bearing 122, and is sealed by an annular seal 124 to prevent the escape of liquid. The opening 116 is closed by the cap 126 which is threaded and which has an annular flange 128 to limit the depth to which it is threaded. A seal 130 prevents the escape of liquid.

The wheel 10 is steered through a steering range indicated from A to B in FIGURE 1. This steering range gives an adequate range of steering angles. The damper mechanism is operative, by the features of the present invention, to apply a substantially uniform damping force for any steering position throughout this range.

For steering the wheel, liquid is admitted to the steering and damping chamber 42 through one of the lines 58 or 62. This flow of pressurized liquid is obtained from a pump 132 delivering liquid under pressure to the valve 60. Line 134 lead from the pump to the valve.

A steering signal is obtainable from a remote location, such as from the airplane, and is supplied to the valve 60, as shown at 136, to force the pressurized fluid to one end of the chamber 42, and release the fluid from the chamber at the other end. The piston 44 will be moved to a definite steering position, and the force of the piston will be transmitted through the segment gear 72 to crank arms 76 and 78 and link 81 to the vertical shaft 26 to control the wheel.

The steering and damping valve 60 also functions in its damping mode or damping function to tend to restrain or hold the fluid in the chamber 42 with a rapid flow release at a predetermined maximum pressure. A certain degree of leakage is provided through damper orifices in the damping mode to achieve optimum performance. Damping of the flow of fluid may be provided by a suitable damping device. A relief valve should usually be provided in order to have rapid swiveling of the wheel such as will occur during cross wind landings. The valve 60 may be of the type shown and disclosed in my co-pending application, "Linear Type Shimmy Steer Damper," Serial No. 629,559, filed December 20, 1956. The valve, however, may be of various suitable types which will accomplish the above function, as will be appreciated by those skilled in the art. The valve functions to direct the fluid to either end of the cylinder and is provided with damping means for damping the fluid flow from the cylinder and is provided with a pressure relief to accommodate shocks. Since this may be accomplished by various mechanisms, the details of which are not part of this invention, the valve 60 may be shown diagrammatically. Thus, the valve 60 functions to move the piston 44 to a steering position with the wheel also moved to said steering position, and in this position the shimmy or rotation shocks to the wheel and vertical shaft 26 are damped.

The valve assembly 60 may be provided, as in the application, Serial No. 629,559, with a reservoir accumulator or a mechanism which incorporates pressure relief springs to limit damping torques to safe values in the event of cross-wind landings and other events causing undue stress.

As illustrated in FIGURE 5, for various angular steering positions of the spindle or vertical shaft 26, the damping torque will remain substantially constant. This uniform damping torque achieves a safe stable system well suited to use in aircraft.

In operation, fluid is admitted to either end of the linear operating piston 44 to move it to various positions. The movement is transmitted by means of the rack 64 to the segment gear 72, which in turn pivots the crank arm 76. The crank arm transmits its motion through link 81 to the crank arm 78 which pivotally positions the vertical shaft or spindle 26. The spindle 26, of course, positions the landing wheel. At various positions within the steering range of the wheel as shown between A and B, in FIGURE 1, the damping torque applied to the wheel is substantially constant. The damping torque applied to the wheel is not constant but may be called relatively constant. It actually varies in accordance with the graph of FIGURE 5, as does the steering torque. Damping torque, however, is a function of damping velocity and would be limited to maximum value by relief valves, such as shown by FIGURE 5. At very low velocity damping torque would be low in any normal installation. With the use of the fluid control system of the co-pending patent application Serial No. 629,559, the wheel is rotated to a steering position, and at this steering position, the damping forces come into play to damp shocks and vibrations to the wheel.

The relationship between the damping torque applied to the wheel, and the angular position of the wheel or spindle supporting the wheel is shown by the graph of FIGURE 5. The angular steering travel of the wheel or spindle with specified torque (the torque required to skid the wheel) is shown as ranging to 75° from center in either a clockwise or a counterclockwise direction (the wheel is free to swivel 360° in the damping mode). Throughout the entire range of steering rotational travel, the torque is substantially linear and decreases only at the very end of the angular travel of the wheel. Thus, for the useful operating range of rotational positions of the wheel, the damping torque applied to the wheel will be substantially constant and this has been achieved with the use of a simplified improved linear damping mechanism.

Thus, it will be seen that I have provided an improved linear steering and damping system which is operative in accordance with the principles and objectives hereinbefore set forth. The mechanism is well adapted to use with aircraft, and it will steer the aircraft wheel to the desired steering position and apply uniform stable damping forces. The damping forces are relatively uniform over a steering range and the uniform damping of the wheel is obtained with a simple linear damping arrangement.

I have, in the drawings and specification, presented a detailed disclosure of the preferred embodiments of my invention, and it is to be understood that I do not intend to limit the invention to the specific form disclosed, but intend to cover all modifications, changes and alternative constructions and methods falling within the scope of the principles taught by my invention.

I claim as my invention:

1. A linear type steer damper for aircraft or the like comprising a piston, a cylindrical hydraulic chamber slidably containing the piston and containing a piston controlling fluid, said piston movable within the chamber to various damping positions, means for conducting a piston position controlling fluid into the ends of the chamber, means for controlling the flow of fluid through said means and preventing rapid escape of fluid at pressures below a predetermined maximum damping pressure, said maximum pressure obtained by shocks transmitted to the piston, a rack connected to the piston, a gear in mesh with the rack, a first crank arm connected to the gear, a second crank arm adapted to be connected to control the position of a rotatable member positioned to rotate about an axis parallel to the axis of said segment gear, a link connecting the ends of said cranks, a wedge-shaped lash adjusting member within the chamber between the rack and chamber wall, and means within the chamber for adjusting the position of the wedge-shaped member with respect to the rack to control back lash.

2. A linear type steer damper for aircraft or the like comprising a piston, a cylindrical hydraulic chamber slidably containing the piston and containing a piston controlling fluid, said piston movable within the chamber to various damping positions, means for conducting a piston position controlling fluid into the ends of the chamber, a rack member connected to the piston, a gear in mesh with the rack and rotatable on an axis fixed with respect to said chamber, a linkage transmitting motion of the gear to a member to be damped, an adjustment member between the rack and inner wall of the chamber, said rack and adjustment members having inclined surfaces between them at an angle to the axis of the chamber, and means within the chamber for axially adjusting the position of the adjustment member with respect to the rack to control the radial position of the rack with respect to the gear and remove lash therebetween.

3. A linear type steer damper for aircraft or the like comprising a piston, a cylindrical hydraulic chamber slidably containing the piston and containing a piston controlling fluid, said piston movable within the chamber to various damping positions, means for conducting a piston position controlling fluid into the ends of the chamber, a rack member connected to the piston, a gear in mesh with the rack and rotatable on an axis fixed with respect to said chamber, a linkage transmitting motion of the gear to a member to be damped, an adjustment member between the rack and inner wall of the chamber, said rack and adjustment members having inclined surfaces between them at an angle to the axis of the chamber, means within the chamber for axially adjusting the position of the adjustment member with respect to the rack to control the lateral position of the rack with respect to the gear and remove lash therebetween, and means for locking the rack and adjustment members against lateral displacement and permitting relative linear adjustment position whereby the adjustment member will remain between the rack and wall of the chamber opposite said gear.

4. A linear type steer damper in accordance with claim 3 wherein said locking means includes a linear tongue and groove joint between the rack and adjustment member with the parts of the joint having free relative linear movement.

References Cited in the file of this patent

UNITED STATES PATENTS

| | | |
|---|---|---|
| 1,500,277 | Selker | July 8, 1924 |
| 1,574,601 | Brundage | Feb. 23, 1926 |
| 2,336,567 | Potter et al. | Dec. 14, 1943 |
| 2,410,643 | Fielding | Nov. 5, 1946 |
| 2,492,649 | MacDuff | Dec. 27, 1949 |
| 2,654,347 | Clark | Oct. 6, 1953 |
| 2,681,438 | Anderson | June 15, 1954 |

FOREIGN PATENTS

| | | |
|---|---|---|
| 607,548 | Germany | Jan. 2, 1935 |
| 1,143,788 | France | Apr. 15, 1957 |